(12) United States Patent
Asaumi

(10) Patent No.: US 7,853,991 B2
(45) Date of Patent: Dec. 14, 2010

(54) DATA COMMUNICATIONS SYSTEM AND DATA COMMUNICATIONS METHOD

(75) Inventor: Yoshiya Asaumi, Kangawa (JP)

(73) Assignee: Sony Corporation, Tokyo (JP)

( * ) Notice: Subject to any disclaimer, the term of this patent is extended or adjusted under 35 U.S.C. 154(b) by 1076 days.

(21) Appl. No.: 11/556,472

(22) Filed: Nov. 3, 2006

(65) Prior Publication Data

US 2007/0107065 A1 May 10, 2007

(30) Foreign Application Priority Data

Nov. 7, 2005 (JP) ............................. 2005-322603

(51) Int. Cl.
*H04L 29/06* (2006.01)
*G06F 7/04* (2006.01)
*G06F 15/16* (2006.01)
*G06F 17/30* (2006.01)

(52) U.S. Cl. ............................................ 726/3; 726/28

(58) Field of Classification Search ...................... 726/3, 726/28
See application file for complete search history.

(56) References Cited

U.S. PATENT DOCUMENTS

| | | | | |
|---|---|---|---|---|
| 5,812,664 A * | 9/1998 | Bernobich et al. | ........... | 380/278 |
| 5,812,669 A * | 9/1998 | Jenkins et al. | ............... | 713/161 |
| 6,078,910 A * | 6/2000 | Brookner et al. | .............. | 705/60 |
| 6,154,768 A * | 11/2000 | Chen et al. | ................... | 709/203 |
| 6,198,696 B1 * | 3/2001 | Korpi et al. | .................... | 368/21 |
| 6,430,292 B1 * | 8/2002 | Ito et al. | ....................... | 380/280 |
| 6,675,153 B1 * | 1/2004 | Cook et al. | .................... | 705/74 |
| 6,760,677 B2 * | 7/2004 | Tanizume | ..................... | 702/89 |
| 6,760,752 B1 * | 7/2004 | Liu et al. | ...................... | 709/206 |
| 6,823,456 B1 * | 11/2004 | Dan et al. | .................... | 713/178 |
| 7,120,854 B2 * | 10/2006 | Lu et al. | ...................... | 714/784 |
| 7,171,368 B1 * | 1/2007 | Sisson et al. | .................. | 705/1.1 |
| 7,266,685 B1 * | 9/2007 | Meandzija et al. | .......... | 713/156 |
| 7,305,491 B2 * | 12/2007 | Miller et al. | ................. | 709/248 |
| 7,318,082 B2 * | 1/2008 | Krissell et al. | .............. | 709/203 |
| 7,353,204 B2 * | 4/2008 | Liu | ............................. | 705/50 |
| 7,475,256 B2 * | 1/2009 | Cook | .......................... | 713/189 |
| 7,493,661 B2 * | 2/2009 | Liu et al. | ....................... | 726/28 |
| 7,552,173 B2 * | 6/2009 | Krissell et al. | .............. | 709/203 |
| 7,571,489 B2 * | 8/2009 | Ong et al. | ...................... | 726/29 |
| 2002/0069076 A1 * | 6/2002 | Faris et al. | ...................... | 705/1 |
| 2002/0104004 A1 * | 8/2002 | Couillard | ..................... | 713/178 |
| 2002/0143710 A1 * | 10/2002 | Liu | .............................. | 705/75 |
| 2002/0152180 A1 * | 10/2002 | Turgeon | ....................... | 705/72 |
| 2003/0115258 A1 * | 6/2003 | Baumeister et al. | ......... | 709/203 |

(Continued)

FOREIGN PATENT DOCUMENTS

JP 2001202014 7/2001

(Continued)

OTHER PUBLICATIONS

Japanese Office Action, issued Mar. 2, 2010, for corresponding Appln. No. JP 2005-322603.

*Primary Examiner*—David García Cervetti
(74) *Attorney, Agent, or Firm*—K&L Gates LLP

(57) ABSTRACT

A data communications system for executing on-demand data communication between a client and a server is provided. The client includes a client request section, and a client response section. The server includes a first server response section, and a second server response section.

9 Claims, 7 Drawing Sheets

U.S. PATENT DOCUMENTS

| | | | |
|---|---|---|---|
| 2003/0220965 A1* | 11/2003 | Krissell et al. | 709/203 |
| 2004/0114673 A1* | 6/2004 | Panchal et al. | 375/148 |
| 2004/0249817 A1* | 12/2004 | Liu et al. | 707/9 |
| 2005/0244146 A1* | 11/2005 | Tsumagari et al. | 386/125 |
| 2005/0244147 A1* | 11/2005 | Yamagata et al. | 386/125 |
| 2007/0289019 A1* | 12/2007 | Lowrey | 726/24 |
| 2008/0155253 A1* | 6/2008 | Liu | 713/155 |

FOREIGN PATENT DOCUMENTS

| | | |
|---|---|---|
| JP | 2001222219 | 8/2001 |
| JP | 2004240596 | 8/2004 |
| JP | 2004-266537 | 9/2004 |

* cited by examiner

DATA COMMUNICATIONS SYSTEM AND DATA COMMUNICATIONS METHOD

CROSS REFERENCES TO RELATED APPLICATIONS

The present application claims priority to Japanese Patent Application JP 2005-322603 filed in the Japanese Patent Office on Nov. 7, 2005, the entire contents of which is being incorporated herein by reference.

BACKGROUND

The present application relates to a data communications system and a data communications method that are suitably applicable to the data communication to be executed between client and server in an on-demand manner.

For example, online transactions based on networks, such as the sale of products over the Internet has been gaining popularity. So-called online trading is one of these online transactions. In transactions based on data that change from time to time, such as transactions concerning shares, the information when and who has executed particular transactions becomes very important.

These days, methods are used in which the past transactional information is managed by servers and transactional records are reported to users via electronic mail, for example. Searching the past transactional information for transaction times and traders provides the information about the timing and time zone in which transactions can be executed.

Also, a time stamp system is disclosed in which setting information, such as database connection information and external clock source connection information, is stored in a setting information file after encrypting the setting information with an encryption key and password, the encrypted setting information is read from the setting information file and decrypted to execute database connection processing or external time source connection processing for example, thereby preventing the setting information from manipulation attack (refer to Japanese Patent Laid-open No. 2004-266537).

However, with the above-mentioned method in which past transactional information is managed by a server, there remains a possibility of manipulation attack against the past transactional information stored in the server. Therefore, this method involves a problem that, with services of limited tradable times and time zones, it is difficult to determine whether or not trading was executed in a particular time and a particular time zone.

The technique disclosed in patent document 1 just discloses a time stamp service based on a public key encryption technique. Therefore, the disclosed technique involves problems that an embodied system may be made large scale and this system indicates just that particular data existed at a particular point of time, not that communication was executed at the particular point of time, thereby making it difficult to find particular trade timings and traders if this data is referenced.

SUMMARY

The present application addresses the above-identified and other problems associated with related-art methods and apparatuses and solves the addressed problems by providing a data communications system and a data communication method that are capable of automatically determine on the basis of time information that services can be provided for a particular party and prevent attempts of manipulation attack on transactional information to in turn prevent the rejection of services based on attack-manipulated information.

According to one embodiment thereof, there is provided a data communications system for executing on-demand data communication between a client and a server. The client has client request means configured to request the server for a negotiation for data communication, and client response means configured to compare time information of the client with time information of the server and return, to the server, the time information of the client and a result indicating success or failure of a client negotiation based on a result indicating appropriate or not of the comparison for profile information supplied from the server. The server has first server response means configured to return profile information indicative of the time information of the server and a message of the data communication to the client on the basis of the negotiation request, and second server response means configured to compare the time information of the server with the time information of the client and return, to the client, the time information of the server and a result indicating success or failure of a server negotiation based on a result indicating appropriate or not of the comparison for the result of success or failure the client negotiation of the client.

According to the above-mentioned configuration, the client requests the server for a negotiation for data communication through the client request means, compares client time information with server time information through the client response means, and returns the client time information and a result indicating success or failure of the client negotiation based on a result indicating appropriate or not of the comparison for profile information supplied from the server.

The server returns, through the first server response means, profile information indicative of the time information of the server and a message of the data communication to the client on the basis of the negotiation request. The server further returns, through the second server response means, compares the time information of the server and the time information of the client to return, to the client, the time information of the server and a result of indicating success or failure a server negotiation based on a result indicating appropriate or not of the comparison for the result indicating success or failure of the client negotiation of the client.

Consequently, through the client response means of the client and the first server response means and the second server response means of the server, transaction timings can be automatically narrowed down for identification by attaching the time information to each message to be transferred between the client and the server, by comparing this time information with the time information of the own terminal, and, if a time difference therebetween is greater than a predetermined value, returning an error to a negotiation made.

According to another embodiment thereof, there is provided a data communications method for executing on-demand data communication between a client and a server. This method has a client request step in which the client requests to the server for a negotiation for data communication; and a first server response step in which profile information indicating the time information of the server and a message of the data communication is returned from the server to the client on the basis of the negotiation request. The data communications method further has a client response step in which the client compares time information thereof with time information of the server, and returns the time information of the client and a result indicating success or failure of a client negotiation based on a result indicating appropriate or not of the comparison for the profile information supplied from the server to the server. The data communications method still further has a second server response step in which the server compares the time information of the server with the time information of the client and returns the time information of the server and a result indicating success or failure of a server negotiation based on a result indicating appropriate or not of the comparison for the result of success or failure of the client negotiation of the client to the client.

According to the above-mentioned configuration, the client requests to the server for a negotiation for data communication in the client request step and, on the basis of the negotiation request from the client, the server returns the server time information and the profile information indicative of a data communications message to the client in the first server response step.

In the client response step, the client compares the client time information with the server time information and returns, to the server, the client time information and a result indicating success or failure of the client negotiation based on a result indicating appropriate or not of the comparison for the profile information. In the second server response step, the server compares the server time information with the client time information and returns, to the client, a result indicating success or failure of the negotiation based on a result indicating appropriate or not of the comparison for the client negotiation of the client.

Consequently, through the client response step of the client and the first server response step and the second server response step of the server, transaction timings can be automatically narrowed down for identification by attaching the time information to each message to be transferred between the client and the server, by comparing this time information with the time information of the own terminal, and, if a difference therebetween is greater than a predetermined value, returning an error to a negotiation made.

Further, a signature is attached to each message to be transferred between the client and the server and each signatured message is stored in the client and the server. This provides the evidence for the client to prevent the negation by the server and for the server to prevent the negation by the client. Besides, the above-mentioned configuration is also applicable to transactions directly exchanging information between unspecified majority in small scale, such as a P2P (Peer-to-Peer) system.

As described, the above-mentioned novel configurations allow the automatic determination whether the other party can be provided with a service, thereby narrowing down transaction timings to limit mates of transaction in accordance with services. Also, the above-mentioned novel configurations can prevent transactional information from being attacked for manipulation, thereby preventing the negation of services by use of the information manipulated otherwise.

Additional features and advantages are described herein, and will be apparent from, the following Detailed Description and the figures.

DETAILED DESCRIPTION

A description in further detail by way of embodiments thereof with reference to the accompanying drawings follows. Now, referring to FIG. 1, there is shown an exemplary configuration of a data communications system practiced as one embodiment of the invention. This diagram shows the connections between terminals that form this data communications system.

Figure 1:
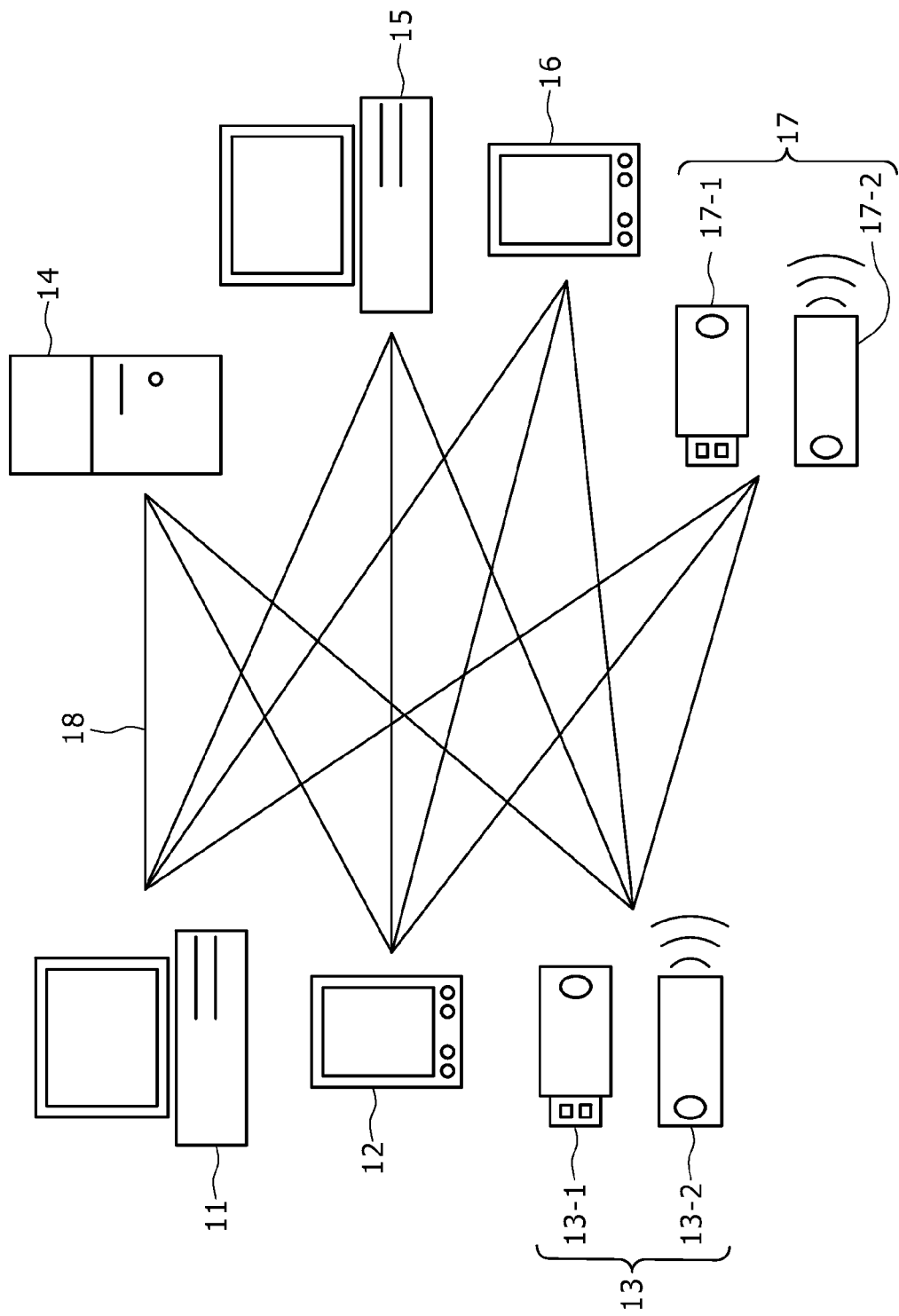
FIG. 1 is a schematic diagram illustrating an exemplary configuration of a data communications system according to an embodiment.

In FIG. 1, various terminals, such as a personal computer (PC) 11, a personal digital assistant (PDA) 12, a personal authentication device 13 made up of a receiver block 13-1 and a sender block 13-2, a server 14, a personal computer (PC) 15, a personal digital assistant (PDA) 16, and a personal authentication device 17 made up of a receiver block 17-1 and a sender block 17-2 are interconnected over a network 18 (wired and wireless).

The personal digital assistant 13 made up of the receiver block 13-1 and the sender block 13-2 and the personal authentication device 17 made up of the receiver block 17-1 and the sender block 17-2 provide security based on the authentication by use of public key and private key in the order placement by a mobile phone and the billing and product delivery by a vender machine after successful authentication and the toll road admission by the ETC (Electronic Toll Collection) card of an automatic fee collection system and the billing by a reader device after successful authentication, for example.

For the connection based on the network 18, various forms are applied, such as short-distance wireless communications methods (Zigbee slower in transmission speed and shorter in transmission range but lower in power dissipation and cost than Bluetooth and UWB (Ultra Wide Band) that transmits and receives data spreadingly over a frequency range as wide as 1 GHz) and the USB (Universal Serial Bus) connection that provides wired data paths between peripheral devices, such as keyboard, mouse, modem, and joystick, and a personal computer, for example.

The communications paths based on the network 18 can be encrypted selectively or totally, thereby further enhancing security strength.

The data communication system according to the present invention allows the identification of the time of the data transfer between terminals within a certain range by executing the negotiations for data communication by use of the time information held in each of terminal devices including the personal computer (PC) 11, the personal digital assistant (PDA) 12, the personal digital assistant 13 formed by the receiver block 13-1 and the sender block 13-2, the server 14, the personal computer (PC) 15, the personal digital assistant (PDA) 16, and the personal authentication device 17 formed by the receiver block 17-1 and the sender block 17-2.

Also, the data communication system according to the present invention can store the data transferred between the terminals, such as the personal computer (PC) 11, the personal digital assistant (PDA) 12, the personal digital assistant 13 formed by the receiver block 13-1 and the sender block 13-2, the server 14, the personal computer (PC) 15, the personal digital assistant (PDA) 16, and the personal authentication device 17 formed by the receiver block 17-1 and the sender block 17-2, thereby preventing the manipulation attack on the time and data after the transfer thereof and preventing the rejection of the other party on the basis of the manipulated data.

Figure 2:
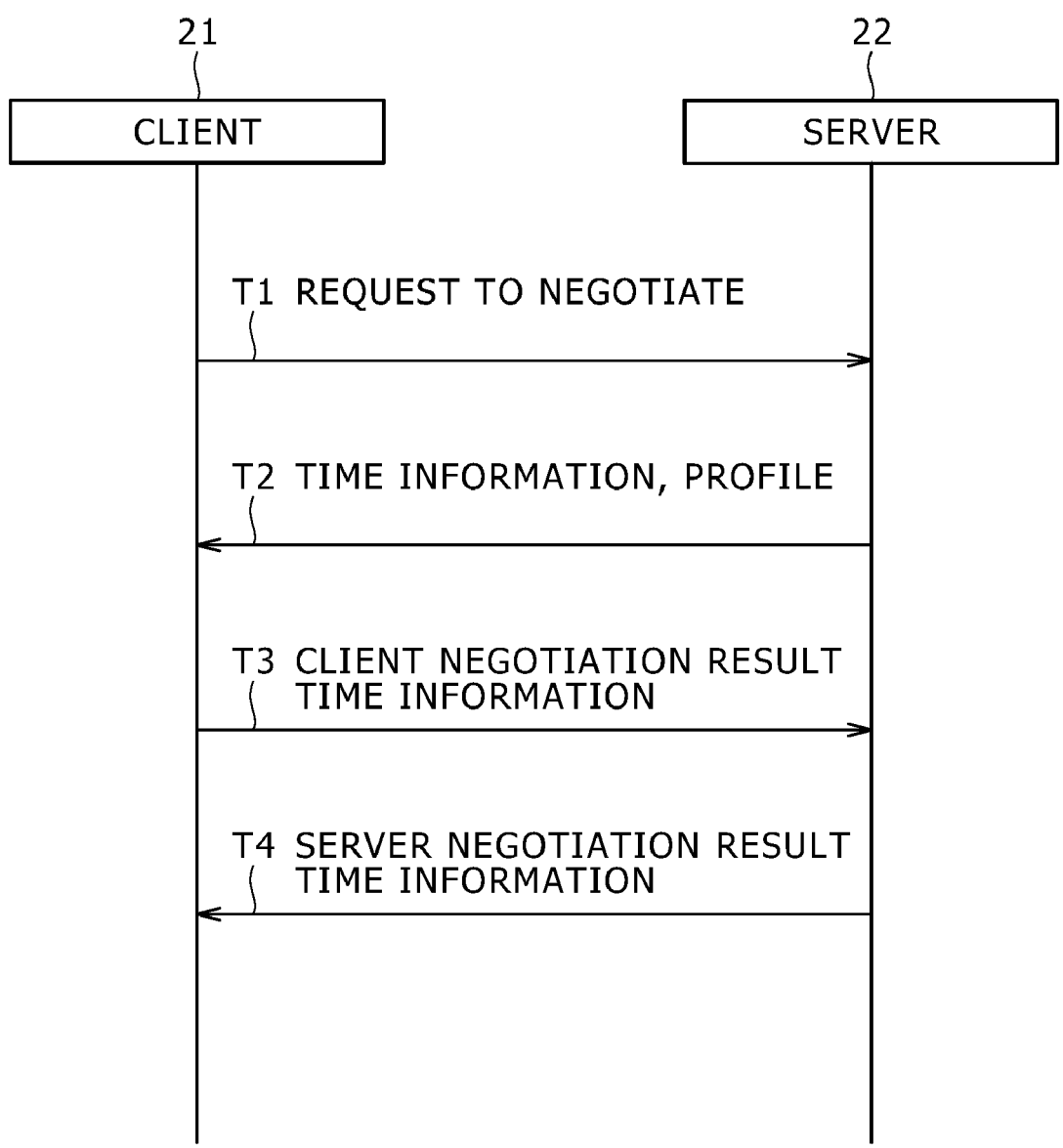
FIG. 2 is a sequence diagram indicative of the transmission and reception of messages between terminals.

Referring to FIG. 2, there is shown a sequence diagram indicative of the transmission and reception of messages between terminals. This figure shows a simplified sequence of the transfer of messages between terminals. In FIG. 2, a terminal that sends requests for messages for example is a client 21 and a terminal that receives these requests is a server 22. In the figure, a time axis is arranged up to down.

At time T1, the client 21 requests the server 22 for a negotiation. At time T2, the server 22 selects a profile indicative of conditions of a service on the basis of the request from the client 21, attaches time information held by the server 22 to the selected profile information, and sends these pieces of information to the client 21.

The profile information sent from the server 22 also contains an error range of time information at the time the specified service is provided. The value of this error range is set to a relatively low level for the services for providing content having a copyright that require a strict time management and relatively a high level for the services for providing content having a copyright that does not require a strict time management. It is also practicable to select between the setting of error range or not.

At time T3, having received a response from the server 22, the client 21 compares the time information held in itself with the time information supplied from the server 22 to check whether or not a result of this comparison is inside the error range indicated by the profile information. If the comparison result is found inside the error range, the client 21 executes a negotiation whether a service that satisfies the profile information can be selected and sends a client negotiation result indicative that the negotiation has been successful or not to the server 22 along with the time information held in the client 21.

At time T4, the server 22 compares the time information held in the server 22 with the time information of the client to determine whether this comparison result is accepted for the negotiation result received from the client 21. If the comparison result is accepted, it indicates that the negotiation is successful; otherwise, it indicates the negotiation failed, which is sent to the client 21 as a response from the server.

It should be noted that, in order to prevent manipulation attack on each message, each message is signatured by each terminal. In addition, each message is stored in each terminal as the transactional information based on data communication for use in verification. If the server rejects a request from the client, the sequences of time T3 and time T4 are not executed.

Figure 3:
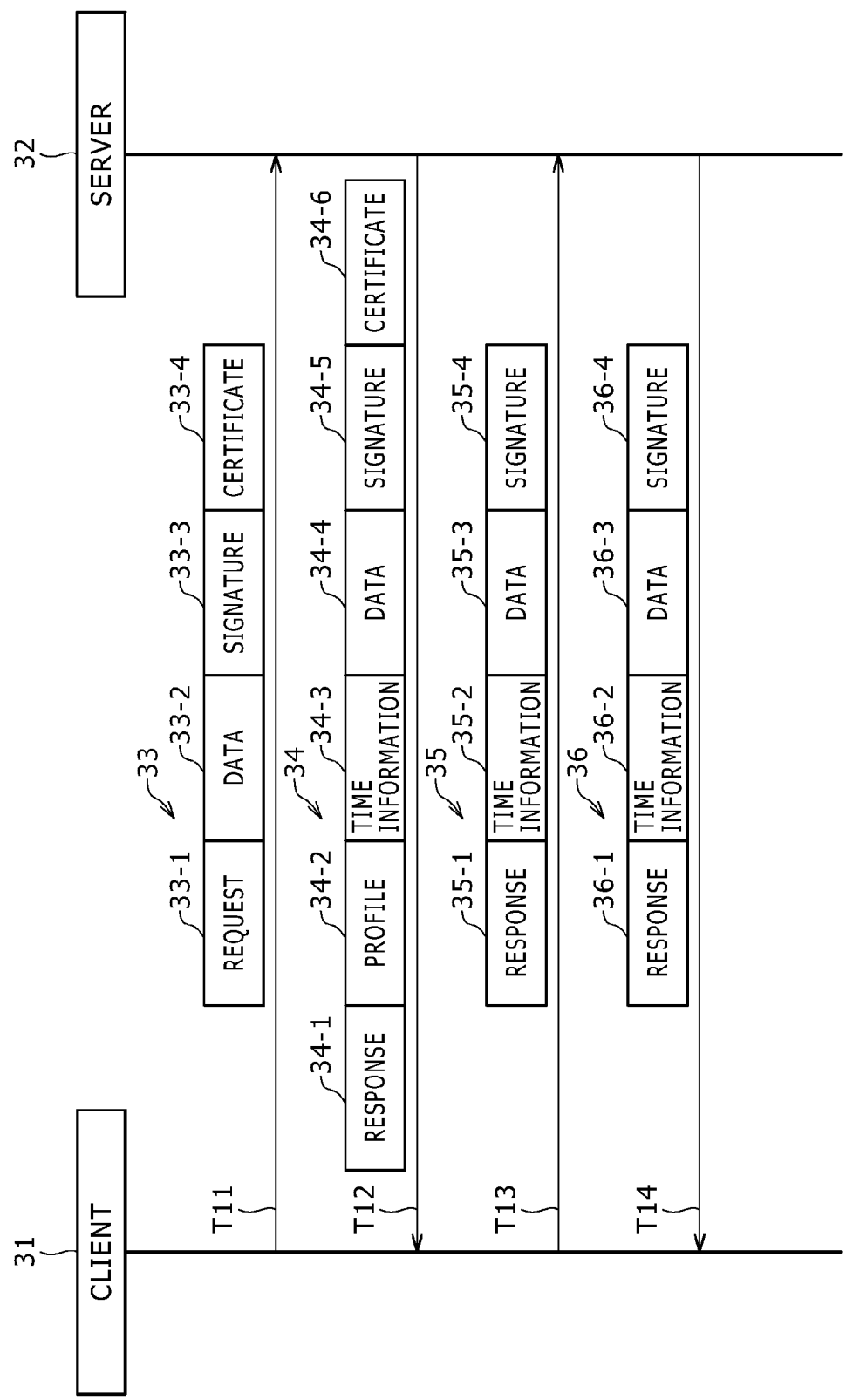
FIG. 3 is a sequence diagram indicative of contents of messages to be transmitted and received between terminals.

Referring to FIG. 3, there is shown a sequence diagram indicative of the contents of messages to be transferred between terminals. This figure shows the data to be transmitted in the sequences shown in FIG. 2.

In FIG. 3, the terminal that requests messages and so on is a client 31 and the terminal that receives requests is a server 32. In the figure, the time axis is arranged up to down. This figure shows an example in which the formats of messages are arranged starting from the left side.

First, at time T11, the client 31 sends, to the server 32, a request 33-1, data 33-2, and a signature 33-3 and a certificate 33-4 for these two pieces of information (the request 33-1 and the data 33-2) as a client request 33. The certificate 33-4 is used to verify the signatures of the client request 33 and a client response 35 to be described later.

At time T12, the server 32 sends, to the client 31, a response (the sever side) 34-1, a profile (allowed time difference) 34-2, time information (the server side) 34-3, data 34-4, and a signature 34-5 and a certificate 34-6 for these four pieces of information (the response (the sever side) 34-1, the profile (allowed time difference) 34-2, the time information (the server side) 34-3, and the data 34-4) as a server response (1) 34. The certificate 34-6 is used for signature verification in the server response (1) 34 and a server response (2) 36 to be described later.

At time T13, the client 31 executes a negotiation for the server response (1) 34 received from the server 32 and sends a negotiation result to the server 32 as a client response 35 along with a response (the client side) 35-1, time information (the client side) 35-2, data 35-3, and a signature 35-4 for these three pieces of information (the response (the client side) 35-1, the time information (the client side) 35-2, and the data 35-3).

At time T14, the server 32 determines whether to access the client response 35 and sends a decision result to the client 31 as a server response (2) 36 along with a response (the server side) 36-1, time information (the server side) 36-2, data 36-3 and a signature 36-4 for these three pieces of information (the response (the server side) 36-1, the time information (the server side) 36-2, the data 36-3). It should be noted that, if an data communications error occurs due to the rejection of negotiation by the client 31 or the server 32, any of the items of the client response 35 may not be included.

It should also be noted that the above-mentioned signature 33-3 and certificate 33-4, the above-mentioned signature 34-5 and certificate 34-6, and the above-mentioned signature 35-4 and certificate 36-4 are capable of securely transmitting and receiving privacy-associated information, credit card numbers necessary for account settlement, and business secrets, for example, by encrypting associated data by use of a protocol such as SSL (Secure Socket Layer) that encrypts information on the Internet for transmitting/receiving the encrypted information.

This SSL is one of encryption algorithms that combine such security techniques as public key and private key, digital certificate, and hash function to prevent data prying and manipulation attacks and spoofing, for example. For example, the above-mentioned signature is used as a private key to generate a hash value for encrypting a plurality of pieces of information in each message. The above-mentioned certificate is used as a public key. Only the signature cannot prove that the public key is that of an authentic holder; attaching the certificate to the signature can prove that the data is not falsified and authenticate the holder of the data through a certificate authority.

Figure 4:
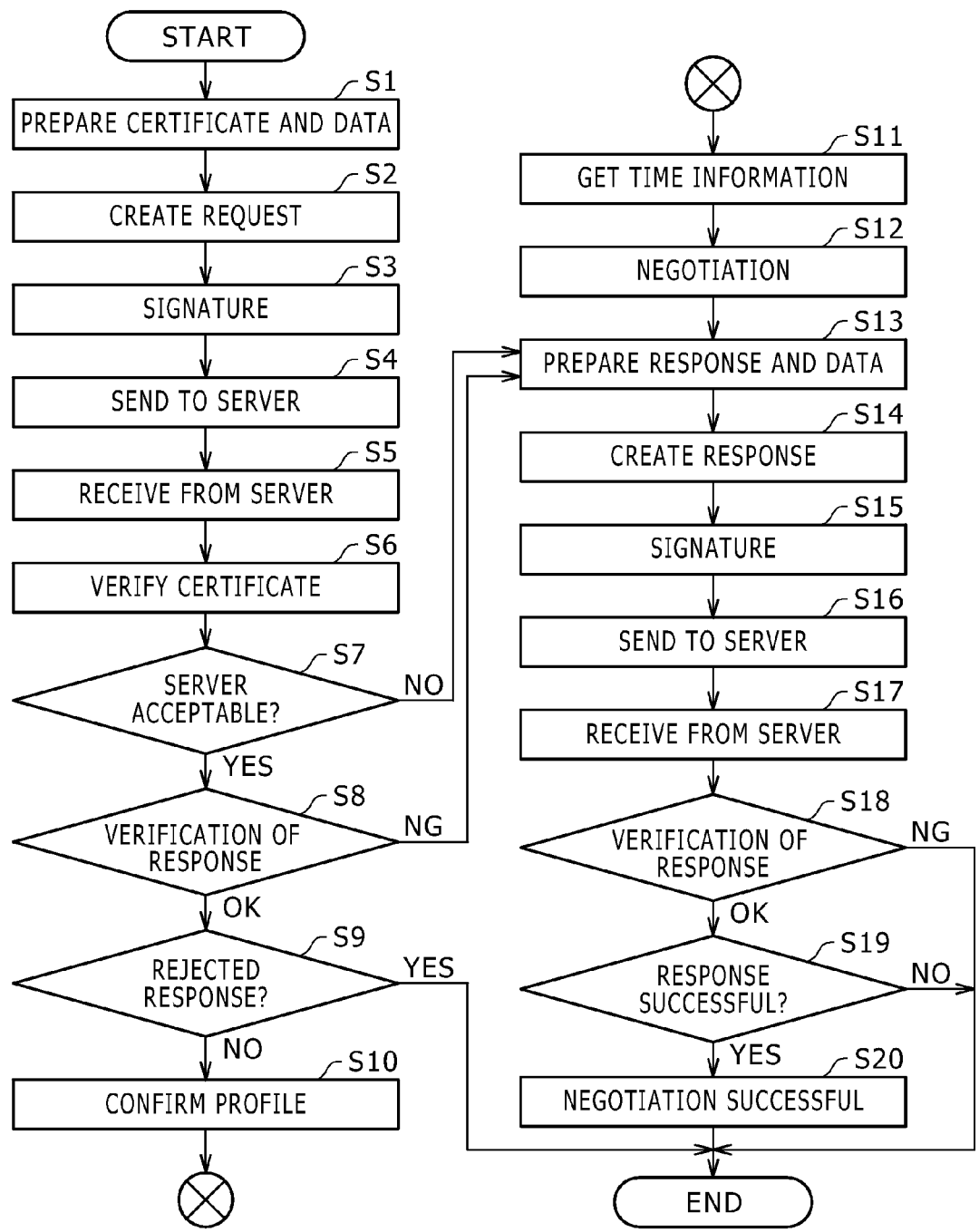
FIG. 4 is a flowchart indicative of operations of the client side.

Referring to FIG. 4, there is shown a flowchart indicative of operations of the client side. In FIG. 4, first, the client prepares a certificate and data to be transmitted (step S1). To be more specific, the client prepares the data 33-2 and the certificate 33-4 as the client request 33 shown in FIG. 3. For example, the data 33-2 contains essential conditions of data communication and the source of the data is ensured by having a certificate authority issue a certificate. The certificate, issued by a certificate authority, is the data for proving that the public key for digital signature analysis is authentic.

Next, the client creates a request (step S2). To be more specific, the client creates the request 33-1 as the client request 33 shown in FIG. 3. For example, the request 33-1 can be created by clickably selecting each icon indicative of a request for product purchase or content download.

Further, the client creates a signature (step S3). To be more specific, the client creates two pieces of information (the request 33-1 and the data 33-2) as the client request 33 shown in FIG. 3. For example, the client generates a hash value when encrypting these two pieces of information (the request 33-1 and the data 33-2) with a signature 33-3 that is a private key. The generated signature is the encrypted signature information for ensuring the validity of each digital document.

At this moment, the client sends the client request 33 shown in FIG. 3 to the server 32 (step S4). Then, the client receives the server response (1) 34 shown in FIG. 3 from the server 32 (step S5). Next, the client executes verification by use of the certificate (step S6). To be more specific, the client verifies the signature 34-5 by use of the certificate 34-6 of the server response (1) 34 received from the server 32 shown in FIG. 3 as the public key.

A certificate is used to certify each creator of a document and, at the same time, ensures that the document has not been attacked for manipulation by the application of a public key encryption scheme. The server that is a signatory sends attaches the signature 34-5 encrypted with the private key thereof to each document and sends the signature and the document. The client that is the recipient decrypts the signature 34-5 by use of the public key of the server that is the signatory, generating a hash value. The contents of a plurality of pieces of information received from the server can be verified by matching this generated hash value against the hash value obtained by encrypting the four pieces of information received from the server with the signature 34-5. In addition to the prevention of manipulation attack attempted by any third party, this is also applicable to the verification that a particular document has been created by the signatory thereof.

Next, the client determines whether or not to accept the server (step S7). To be more specific, if the contents of the plurality of pieces of information received from the server are found good by the verification executed in step S6, then the client permits the acceptance of the server; otherwise, the client rejects the acceptance of the server.

If the acceptance of the server is permitted as a result of the decision done in step S7, then the response is verified (step S8). To be more specific, the client checks whether there is any manipulation attack in the response (the server side) 34-1, profile (an allowable time error) 34-2, time information (the server side) 34-3, and data 34-4 of the server response (1) 34 received from the server 32 shown in FIG. 3. If the acceptance of the server is not permitted by the decision done in step 7 and the verification of the response has failed in step S8, then the procedure goes to step S13.

If the response is found successfully verified in step S8, the client determines whether or not to reject the response (step S9). To be more specific, the client determines whether or not to end the processing without making the rejection response by the client response 35 to the server 32 shown in FIG. 3. If the rejection response is made in step S9, then the processing ends immediately.

If the rejection response is not made in step S9, then the client checks the profile (step S10). To be more specific, the client checks the profile (the allowable time error) 34-2 of the server response (1) 34 from the server 32 shown in FIG. 3. Next, the client acquires the time of the terminal thereof (step S11). To be more specific, the client acquires, from the internal clock thereof, the time information (the client side) 35-2 shown in FIG. 3 of the terminal thereof.

Then, the client executes a negotiation (step S12). To be more specific, the client compares the time information of the terminal thereof with the time information received from the server to determine whether or not the result of this comparison falls within the allowable error range indicated in the profile information. If the comparison result is found falling within the allowable error range, then the client executes a negotiation whether a service that satisfies the profile information can be selected.

The client makes preparations for a response and data (step S13). To be more specific, the client prepares the client negotiation result indicative of the successful or failed negotiation in step S12 and the time information of the terminal of the client. If the server acceptance is not permitted in step S7 or, if the response verification failed in step S8, then the client negotiation indicative of negotiation failure is obtained.

Next, the client creates a response (step S14). To be more specific, the client creates a response (the client side) 35-1 as the client response 35 to the server 32 shown in FIG. 3. Then, the client executes a signature (step S15). To be more specific, the client attaches a signature 35-4 to three pieces of information (response (the client side) 35-1, time information (the client side) 35-2, and data 35-3) as the client response 35 to the server 32 shown in FIG. 3.

The client executes transmission to the server (step S16). To be more specific, the client sends the response (the client side) 35-1, time information (the client side) 35-2, data 35-3, and the signature 35-4 attached to these three pieces of information to the server 32 as the client response 35 shown in FIG. 3.

Next, the client executes reception from the server (step S17). To be more specific, the client receives the server response (2) 36 shown in FIG. 3. Then, the client verifies the response (step S18). To be more specific, the client checks the response (the server side) 36-1, time information (the server side) 36-2, and data 36-3 as the server response (2) 36 received from the server 32 shown in FIG. 3 for any manipulation attack.

If the verification is successful in step S1 8, then the client determines whether or not to make a successful response (step S19). To be more specific, if no manipulation attack is found in the response (the server side) 36-1, time information (the server side) 36-2, and data 36-3 as the server response (2) 36 received from the server 32 shown in FIG. 3, then the client processes this as a successful response.

If the verification failed in step S18 or no successful response is made in step S19, then the processing ends immediately. If a successful response is made in step S19, then the client executes negotiation successful processing.

Consequently, the certification verification allows the client to determine whether to accept the server side. Accordingly, the client can reject, on the basis of the time information, the negotiation with any server that is not reliable.

Figure 5:
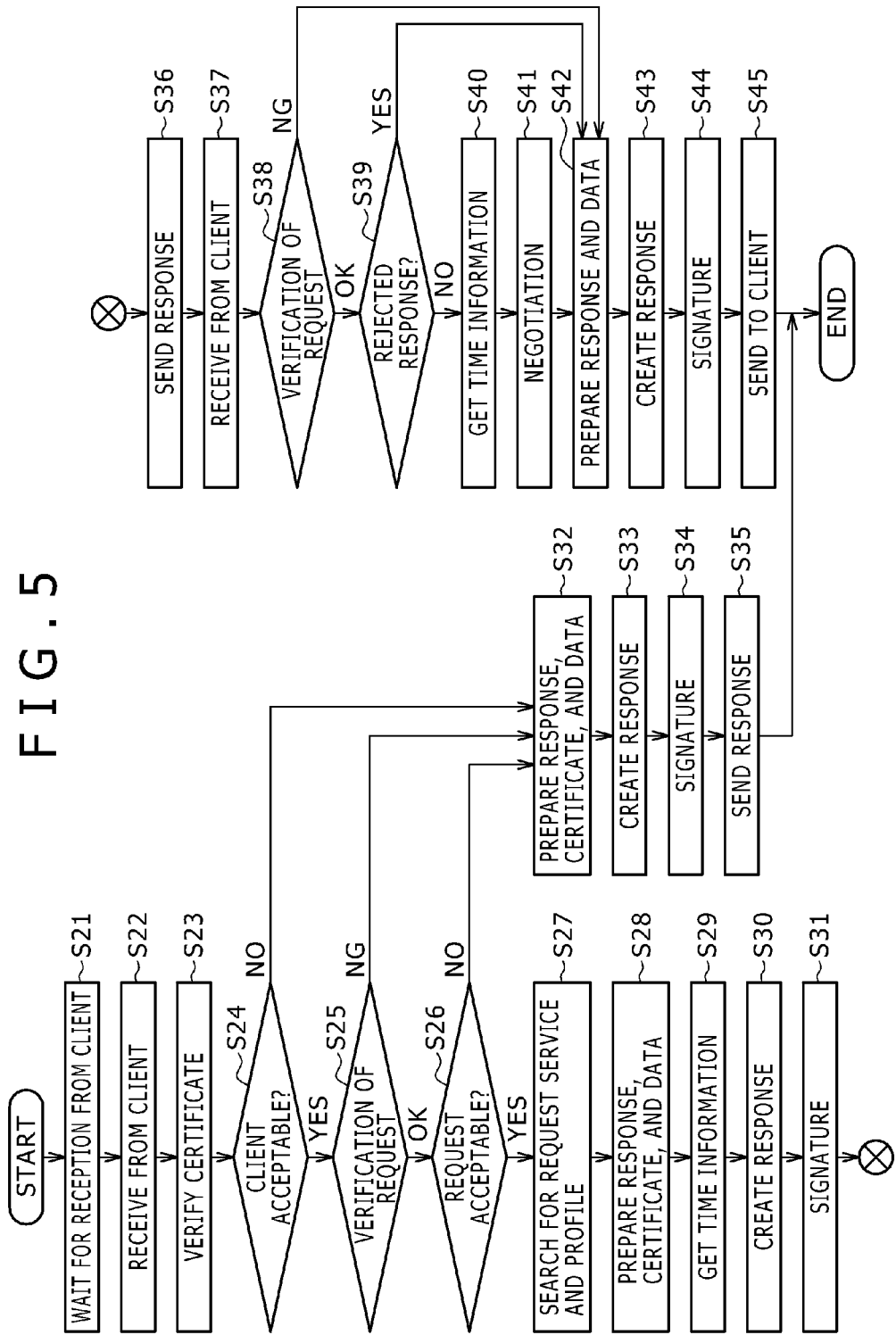
FIG. 5 is a flowchart indicative of operations of the server side.

Referring to FIG. 5, there is shown a flowchart indicative of operations of the server side. In FIG. 5, the server waits for reception from the client (step S21). To be more specific, the server waits a client request 33 from the client 31 shown in FIG. 3. Receiving the client request 33 (step S22), the server executes verification by use of the certificate (step S23). To be more specific, the server verifies the signature 33-3 by use of the certificate 33-4 of the client request 33 from the client 31 shown in FIG. 3 as a public key.

Next, the server determines whether to accept the client (step S24). To be more specific, if the plurality of pieces of information received from the client are found good as the result of the verification executed in step S23, then the server permits the acceptance of the client; otherwise, the server rejects the acceptance of the client.

If the acceptance of the client is permitted as a result of the decision of step S24, then the server verifies the request (step S25). To be more specific, the server checks the request 33-1 and data 33-2 of the client request 33 received from the client 31 shown in FIG. 3 for any manipulation attack.

If the verification of the request is found successful in step S25, then the server determines whether or not to permit the acceptance of the request (step S26). To be more specific, the server determines whether or not to execute a successful response or a failed response on the basis of the client request 33 received from the client 31 shown in FIG. 3.

If the server determines not to permit the acceptance of the client in step S24, if the request is verified failing in step S25, or if the response is rejected in step S26, then the procedure goes to step S32. If the request is accepted in step S26, then the server searches for a request service and a profile (step S27). To be more specific, the server searches for a service and a profile that correspond to the request 33-1 of the client request 33 received from the client 31 shown in FIG. 3.

Next, the server makes preparations for a response, a certificate, and data (step S28). To be more specific, the server prepares a response 34-1 a profile 43-2, and data 43-4 indicative of the service found as a result of the search executed in step S27. Then, the server acquires the time of the terminal thereof (step S29). To be more specific, the server acquires, from the internal clock thereof, the time information (the server side) 34-3 shown in FIG. 3 of the terminal thereof.

Next, the server creates a response (step S30). To be more specific, the server creates a response (the server side) 34-1 as the server response (1) 34 to the client 31 shown in FIG. 3. Then, the server executes a signature (step S31). To be more specific, the server attaches a signature 34-5 to four pieces of information (response (the server side) 34-1, a profile (allowable time error) 34-2, time information (the server side) 34-3, and data 34-4) as the server response (1) 34 to the client 31 shown in FIG. 3.

The server executes transmission to the client (step S36). To be more specific, the server sends the response (the server side) 34-1, the profile (allowable time error) 34-2, time information (the server side) 34-3, data 34-4, and the signature 34-5 attached to these four pieces of information to the client 31 as the server response (1) 34 shown in FIG. 3.

If the acceptance of the client is not permitted in step S24, the request verification failed in step S25, or the response is rejected in step S26, then the server makes preparations for a response and data (step S32). To be more specific, the server prepares the result of the server response (1) 34 for that the acceptance of the client is not permitted in step S24, the request verification failed in step S25, or the response is rejected in step S26, and the time information of the terminal of the server.

Next, the server creates the response (step S33). To be more specific, the server creates the response (the server side) 34-1 as the server response (1) 34 to the client 31 shown in FIG. 3. Then, the server executes a signature (step S34). To be more specific, the server attaches a signature 34-5 to the four pieces of information (a response (the server side) 34-1, a profile 34-2, time information (the server side) 34-3, and data 34-4) as the server response (1) 34 to the client 31 shown in FIG. 3.

Then the server sends the response to the client and ends the processing (step S35). To be more specific, the server sends the response (the server side) 34-1, the profile 34-2, the time information (the server side) 34-3, the data 34-4, and the signature 34-5 for these four pieces of information (the response (the server side) 34-1, the profile 34-2, the time information (the server side) 34-3, and the data 34-4) as the server response (1) 34 to the client 31.

Next, the server executes the reception from the client (step S37). To be more specific, the server receives the client response 35 shown in FIG. 3. Then, the server verifies the received response (step S38). To be more specific, checks the response (the client side) 35-1, the time information (the cline side) 35-2, and the data 35-3 as the client response 35 received from the client 31 shown in FIG. 3 for any attack manipulation.

If the response verification is found successful in step S38, then the server determines whether to reject the response (step S39). To be more specific, if the response (the client side) 35-1, the time information (the cline side) 35-2, and the data 35-3 as the client response 35 shown in FIG. 3 are found not attack-manipulated, it is processed as a successful response. If the response verification is found failing in step S38 or if the response to rejected in step S39, then the procedure goes to step S42.

Next, the server acquires the time of the terminal thereof (step S40). To be more specific, the server acquires, from the internal clock thereof, the time information (the server side) 36-2 shown in FIG. 3 of the terminal thereof. Then, the server executes a negotiation (step S41). To be more specific, the server compares the time information of the terminal thereof with the time information received from the client to determine whether or not a result of this comparison falls within the error range indicated in the client response 35. If the result of the comparison is found falling within the error range, then the server executes a negotiation whether a service that satisfies the client response 35 can be selected.

Next, the server makes preparations for a response and data (step S42). To be more specific, the server prepares a result of the negotiation indicative of the successful or failed negotiation of step S41 and the time information of the terminal of the server. If the response verification in step S38 failed or the response is rejected in step S39, it provides a server negotiation result indicative of a negotiation failure.

Then, the server creates a response (step S43). To be more specific, the server creates a response (the server side) 36-1 as the server response (2) 36 to the client 31 shown in FIG. 3. Next, the server executes a signature (step S44). To be more specific, the server attaches the signature 36-4 to the three pieces of information (a response (the server side) 36-1, time information (the server side) 36-2, and data 36-3) as the server response (2) 36 to the client 31 shown in FIG. 3.

Next, the server executes transmission to the client (step S45). To be more specific, the server sends the response (the server side) 36-1, the time information (the server side) 36-2, the data 36-3, and the signature 36-4 attached to these three pieces of information as the server response (2) 36 to the client 31 shown in FIG. 3.

Consequently, the server can verify the certificate so as not to execute a negotiation with any unreliable clients on the basis of the time information, thereby accepting no unreliable client.

Figure 6:
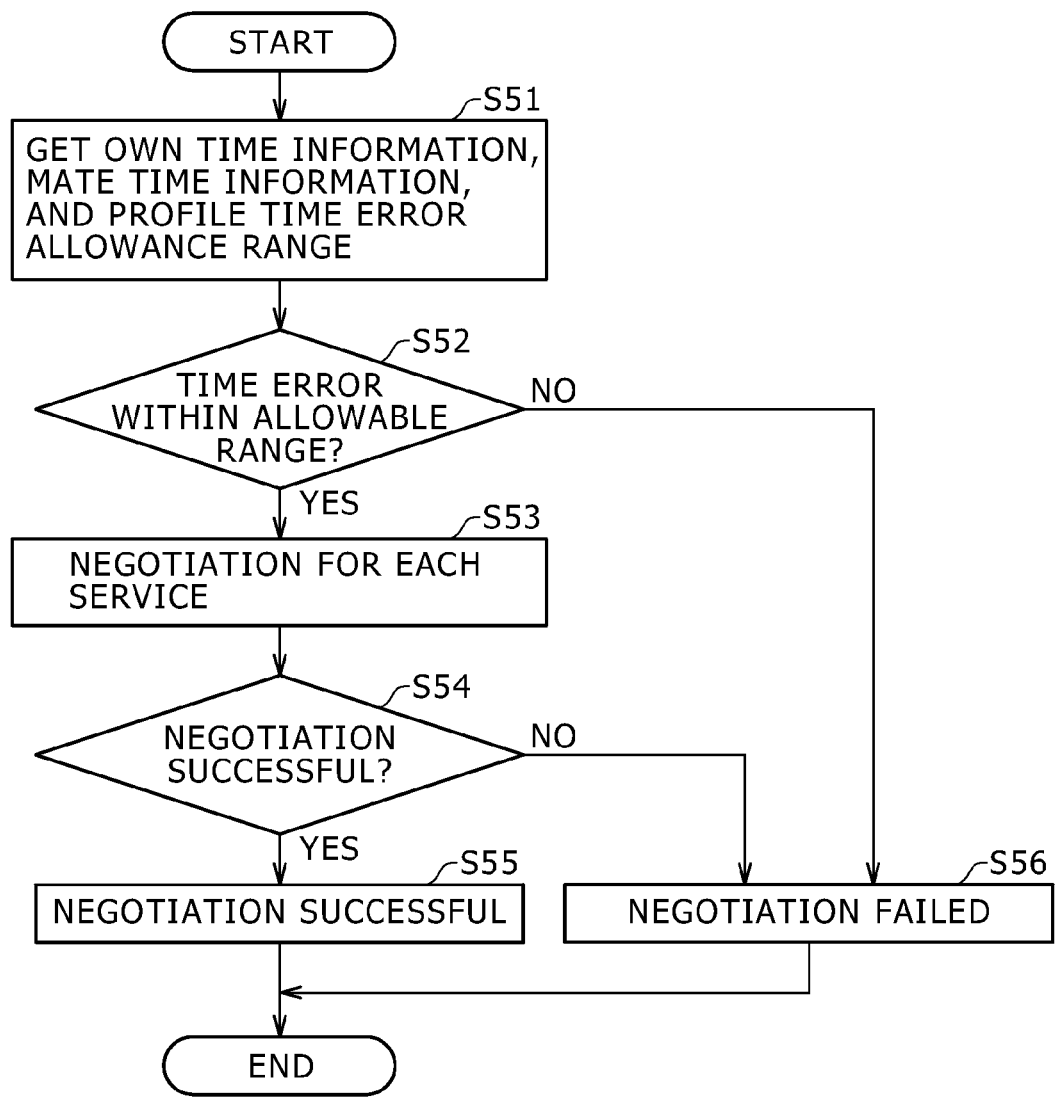
FIG. 6 is a flowchart indicative of operations of time and service negotiations.

Referring to FIG. 6, there is shown a flowchart indicative of operations of time and service negotiations. In FIG. 6, the client and the server each acquire time information of the own terminal, time information of the mate terminal, and a profile time error allowable range (step S51). Next, the client and the server each determine whether or not a time difference between the own terminal time information and the mate terminal time information falls within the profile time error allowable range (step S52).

If the time error between the own terminal time information and the mate terminal time information is found within the profile time error allowable range in step S52, then the client and the server each executes a negotiation for each service (step S53). Then, the client and the server determine whether or not the negotiation is successful (step S54). If the negotiation is found successful in step S54, then the client and the server execute successful negotiation processing (step S55). If the time error between the own terminal time information and the mate terminal time information is found outside the profile time error allowable range in step S52 or if the negotiation is found failing in step S54, then the client and the server execute failed negotiation processing (step S56).

As described above, the client and the server execute a time negotiation based on profiles and, if the negotiation is successful, execute a negotiation for each service. If these two negotiations are successful, then the negotiation of the data communication as a whole between the client and the server is successful.

Figure 7:
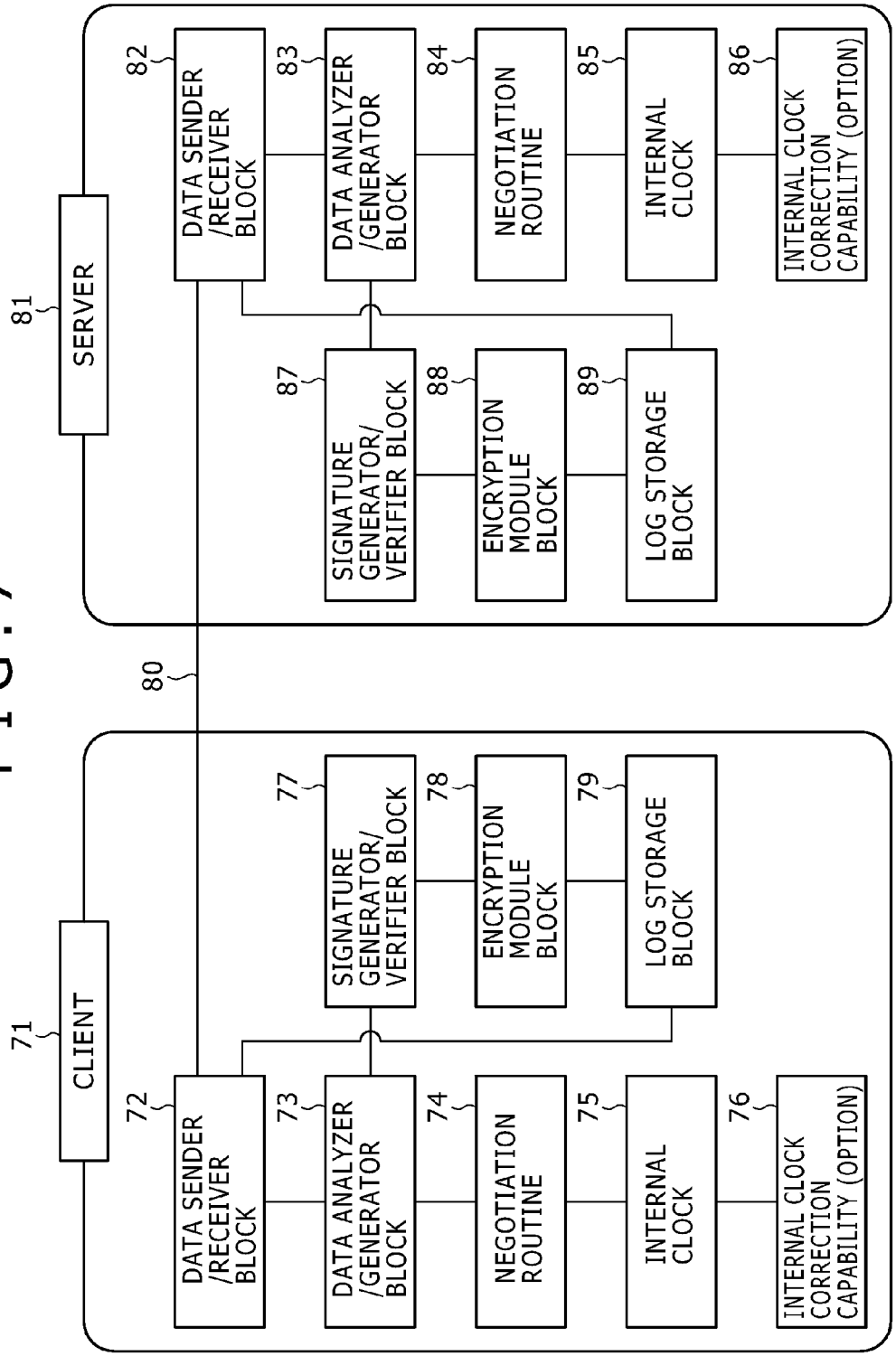
FIG. 7 is a functional block diagram illustrating an exemplary configuration of each terminal.

Referring to FIG. 7, there is shown a functional block diagram illustrating an exemplary configuration of each of the component terminals of the data communications system according to the invention. In FIG. 7, the client and the server are configured so as to be substantially the same in function. The client and the server have data sender/receiver blocks 72, 82 respectively, data analyzer/generator blocks 73, 83 respectively, and negotiation routine blocks 74, 84 respectively for executing a time negotiation based on a profile.

The client and the server have signature generator/verifier blocks 77, 78 respectively for generating a signature for generated data and verifying a signature for analyzed data, encryption module blocks 78, 88 respectively for encrypting and decrypting based on signature, and log storage blocks 79, 89 respectively for storing communications log data. In addition, the client and the server have internal clocks 75, 85 respectively for providing time information for use in negotiation and internal clock correction capabilities 76, 86 respectively for correcting the clock information.

The above-mentioned encryption module blocks 78, 88 may be configured by either hardware or software; in terms of security strength, the hardware module resistant against manipulation attack is better. As described above, the client and the server have the internal clocks 75, 85 respectively; however, in order to maintain correct time information, the client and the server can optionally use the internal clock correction capabilities 67, 86 respectively. For example, the correction based on the wave clock, the GPS (Global Positioning System), or the NTP (Network Time Protocol) is practicable.

For the verification by the signature generator/verifier blocks 77, 87, an ordinary public key signature verification technique, such as SSL, may be used. Further, storing communications log data into the log storage blocks 79, 89 can prevent the data from being attacked for manipulation and negated.

The above-mentioned embodiment of the present invention allows the user to acquire the time at which each message between the client and the server has been created by adding time information to the message. In addition, attaching a signature to each message between the client and the server allows the detection of any messages transmitted to the mate terminal that have not been created by the own terminal or the detection of manipulation attack on each message created by the own terminal.

Further, storing each message between the client and the server as communications log data allows the use of the log data as the evidence for the prevention of the negation of data including time information. Besides, selecting various profiles allows the setting of time error ranges in accordance with types of services. In addition, because the present embodiment does no require facilities of large scale, such as the time stamp based on public encryption key, the present embodiment can be realized by a simplified configuration.

The present embodiment allows the use of a P2P system between terminals that are not networked. Further, leaving a log in each terminal allows the negation of the other party by use of the communication log data of the client against illegal activities such as the alteration of a server message after the provision of a service. Likewise, the present embodiment also allows the negation of the message manipulation attack on the client side.

As described above and according to the data communications time insurance and negation prevention techniques based on the public key encryption and the terminal time information associated with the present embodiment, transaction timings can be narrowed down for identification by attaching the time information to each message to be transferred between the client and the server, by comparing this time information with the time information of the own terminal, and, if a difference therebetween is greater than a predetermined value, returning an error to a negotiation made.

In addition, a signature is attached to each of the abovementioned messages and the message and signature are left in the client and the server as communications log data. This configuration provides the evidence for the client to prevent the negation by the server and for the server to prevent the negation by the client. Besides, the present embodiment is also applicable to transactions of small scale, such as a P2P system.

While preferred embodiments of the present invention have been described using specific terms, such description is for illustrative purpose only, and it is to be understood that changes and variations may be made without departing from the spirit or scope of the following claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A data communication system for executing on-demand data communication, the data communication system comprising:
    a client; and
    a server;
    said client including:
        (a) a first processor;
        (b) a first transmitter operatively coupled to the first processor; and
        (c) a first memory device operatively coupled to the first processor, the first memory device storing first instructions which when executed by the first processor, cause the first processor to operate with the first transmitter to:
            (i) request, from said server, a negotiation for data communication;
            (ii) compare first time information of said client with second time information of said server, said second time information being included in profile information which is sent from said server; and
            (iii) transmit, to said server:
                (A) said first time information of said client; and
                (B) a result indicating success or failure of a client negotiation based on a result of said comparison of said first time information of said client with said second time information of said server;
    said server including:
        (a) a second processor;
        (b) a second transmitter operatively coupled to the second processor; and (c) a second memory device operatively coupled to the second processor, the second memory device storing second instructions which when executed by the second processor, cause the second processor to operate with the second transmitter to:
  (i) in response to said negotiation for data communication being requested, transmit, to said client:
    (A) the profile information indicative of said second time information of said server; and
    (B) a message of said data communication; and
  (ii) compare said second time information of said server with said first time information of said client;
  (iii) transmit, to said client:
    (A) said second time information of said server; and
    (B) a result indicating success or failure of a server negotiation based on a result of said comparison of said second time information of said server with said first time information of said client.

2. The data communications system of claim 1, wherein, for said profile information, an error in time information is specifiable in accordance with a service of said data communication and setting of said error in time information is selectable.

3. The data communications system of claim 1, wherein said negotiation request, said second time information of said server, said profile information, said first time information of said client, said result indicating success or failure of said client negotiation, and said result indicating success or failure of said server negotiation are each attached with an electronic signature.

4. The data communications system of claim 1, wherein said negotiation request, said second time information of said server, said profile information, said first time information of said client, said result indicating success or failure of said client negotiation, and said result indicating success or failure of said server negotiation are stored in said client and said server.

5. The data communications system according to claim 1, wherein:
  (a) the first instructions, when executed by the first processor, cause the first processor to correct said time information of said client; and
  (b) the second instructions, when executed by the second processor, cause the second processor to correct said time information of said server.

6. The data communications system of claim 1, wherein the first instructions, when executed by the first processor, cause the first processor to:
  (a) determine whether to permit acceptance of said server;
  (b) verify a response from said server; and
  (c) determine whether said response to said server is success or failure.

7. The data communications system according to claim 1, wherein the second instructions, when executed by the second processor, cause the second processor to:
  (a) determine whether to permit acceptance of said client;
  (b) verify a response from said client; and
  (c) determine whether to permit acceptance of a request for said client.

8. The data communications system of claim 1, wherein the second instructions, when executed by the second processor, cause the second processor to:
  (a) verify a response from said client; and
  (b) determine whether said response is negated to said client.

9. A method of operating a data communication system for executing on-demand data communication, the data communication system including: (a) a client having a first processor and first instructions; and (b) a server having a second processor and second instructions, the method comprising:
  (a) causing the first processor to execute the first instructions to:
    (i) request, from said server, a negotiation for data communication;
    (ii) compare first time information of said client with second time information of said server, said second time information being included in profile information which is sent from said server; and
    (iii) transmit, to said server:
      (A) said first time information of said client; and
      (B) a result indicating success or failure of a client negotiation based on a result of said comparison of said first time information of said client with said second time information of said server; and
  (b) causing the second processor to execute the second instructions to:
    (i) in response to said negotiation for data communication being requested, transmit, to said client:
      (A) the profile information indicative of said second time information of said server; and
      (B) a message of said data communication; and
    (ii) compare said second time information of said server with said first time information of said client; and
    (iii) transmit, to said client:
      (A) said second time information of said server; and
      (B) a result indicating success or failure of a server negotiation based on a result of said comparison of said second time information of said server with said first time information of said client.

* * * * *